United States Patent [19]

Yoshiike et al.

[11] 4,061,307
[45] Dec. 6, 1977

[54] BALL VALVE

[75] Inventors: Kiwamu Yoshiike; Hitoshi Yazaki, both of Tokyo, Japan

[73] Assignee: Kitazawa Shoji Kabushiki Kaisha, Japan

[21] Appl. No.: 647,003

[22] Filed: Jan. 7, 1976

[30] Foreign Application Priority Data

June 6, 1975 Japan .................................. 50-68428

[51] Int. Cl.² .............................................. F16K 5/00
[52] U.S. Cl. .................................... 251/315; 251/317; 251/174
[58] Field of Search ...................... 251/174, 315, 317; 277/205; 267/161

[56] References Cited

U.S. PATENT DOCUMENTS

| 1,893,814 | 1/1933 | Widin | 267/161 |
|---|---|---|---|
| 2,516,191 | 7/1950 | Englesson | 277/205 X |
| 3,114,561 | 12/1963 | Creath | 277/205 X |
| 3,157,190 | 11/1964 | Allen | 251/315 X |
| 3,259,383 | 7/1966 | Johnson | 267/161 |
| 3,497,178 | 2/1970 | Priese | 251/174 |
| 3,920,036 | 11/1975 | Westenrieder | 251/174 X |

Primary Examiner—Howard W. Wealsley
Attorney, Agent, or Firm—McNenny, Pearne, Gordon, Gail, Dickinson & Schiller

[57] ABSTRACT

A ball valve including coupled outer casing elements adapted to enclose a rotationally movable valve body having a flow passageway therethrough is provided. An annular sealing member is disposed adjacent each of the opposite ends of the flow passageway between the movable valve body and the outer casing elements. An annular resilient member having a U-shaped cross-section and opposed walls comprising a plurality of resilient segments is loaded in each of the sealing members to spring-load each of them into sealing engagement with the movable valve body and outer casing elements. The movable valve body is supported by a cone spring which is in point contact with the outer casing elements and line contact with the movable valve body.

1 Claim, 7 Drawing Figures

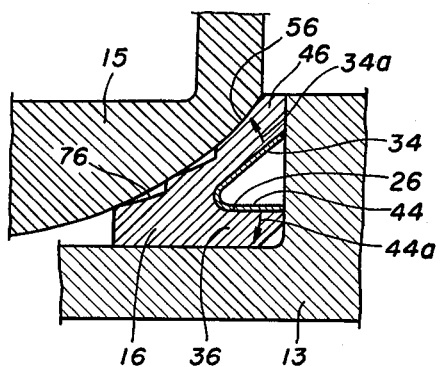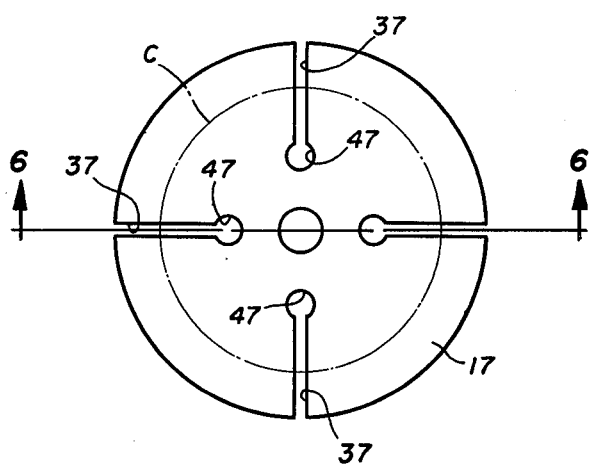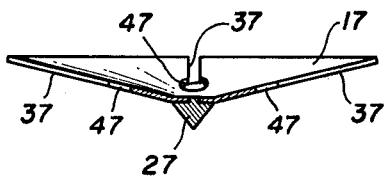

BALL VALVE

BACKGROUND OF THE INVENTION AND PRIOR ART

The present invention relates to a ball valve adapted to be inserted into a pipe line system for the purposes such as opening and closure, and change-over of a flow path. It should be noted that the term "flow path" as used herein includes both the path of pressurized liquid and the path of high pressure gas such as steam.

It is most important that ball valves employed in such applications remain leak-free though in use for many years in a high pressure liquid or gas flowing environment, and that they always provide easy and rapid operation. Various improvements have been proposed to satisfy these requirements, and these improvements have often been directed to the arrangement for the sealing and intercepting effect desired between a movable component located in the flow path and a stationary component enclosing the movable component. More specifically, various improvements have been directed to effective maintenance of liquid- or gas-tightness in the intercepting arrangement, and a high wearing resistance of the movable component which may be repeatedly operated.

Generally, the movable component in a ball valve is a valve body shaped substantially in a sphere, and the stationary component is an outer casing adapted to enclose the movable component. Accordingly, intercepting surfaces between the substantially spheric valve body and the outer casing enclosing the valve body must be maintained in close contact with high precision. This is especially true in a ball valve employed in a high pressure environment wherein the valve body serving as the movable component is also influenced by the high pressure, and the operation of the valve body under such a high pressure imposes a high frictional pressure particularly to the surface of the valve body which is in contact with the outer casing. To overcome such a frictional pressure, there has recently been provided an annular sealing member serving as a valve seat. The annular sealing member is formed of a high molecular weight plastic such as Teflon, and it is interposed between the movable valve body and the stationary outer casing so as to provide a resistance to possible wearing due to the operation of the movable valve body.

Even with such an improvement, however, the sealing member may be subjected to so-called plastic flow depending on the frequency at which the valve body is operated or to the deformation and distortion due to wearing, resulting in deterioration of the interception. The annular sealing member interposed between the movable valve body and the stationary outer casing has its surface in contact with the valve body and rubs against the valve body as the latter is rotated. The valve body is formed at this particular portion as an accurate convexo-spherical surface, and the portion of the sealing member being in contact with this convexo-spherical surface is formed as an accurate concavo-spherical surface to maintain the desired intercepting effect at a high level. However, leakage cannot be reliably prevented by only the foregoing measure unless a sufficient contact pressure is exerted upon the rubbing surface. The accurate form required for the rubbing surface would be deformed due to wearing caused by repeated operation of the valve unless the contact pressure exerted upon the rubbing surface may respond at every portion to the deformation.

In one of the most recently developed ball valves, it has been proposed that the annular sealing member serving as the valve seat include a cylindrical outer periphery, a concavo-spherical inner surface and an annular groove extending therebetween. In this structure, the cylindric outer periphery bears against the inner surface of the stationary outer casing, and the concavo-spheric inner surface is in slidable contact with the outer surface of the movable valve body. The annular sealing member has a generally V-shaped, radial cross-section, and the concavo-spheric inner surface is saucer shaped.

Specifically, it has been proposed that a biasing pressure extending in the directions in which the annular groove is transversely contracted be exerted on the cylindric outer periphery and concavo-spherical inner edge in assembling the ball valve so that a force counteracting the potential pressure may urge the sealing member against the movable valve body. Additionally, a fluid pressure in the flow path is positively introduced into the annular groove so that the concavo-spherical surface in the form of a saucer is brought into close contact with the convexo-spherical surface of the valve body.

The foregoing biasing pressure for maintenance of close contact has been found to result in an unreasonably large force of operation since the counteracting force is provided by a tightening force in assembling the valve and such a tightening force increases not only a degree of close contact but also a frictional force. Thus, the tightening force to be used in assembling the ball valve is limited. Similarly, the use of fluid pressure within the annular groove to urge the concavo-spherical inner surface against the valve body from the rear side of the inner surface and simultaneously to urge the cylindrical outer periphery against the outer casing from the rear side of the outer periphery may provide the desired effect but only under the fluid pressure in excess of a certain limit which overcomes the rigidity determined by the material and the thickness of the sealing member itself. A ball valve employing such a measure will be effective as a ball valve adapted for a high pressure but clearly disadvantageous in the aspect of versatility.

In larger diameter pipe line systems employing comparably sized ball valves to control fluid flow in the system, the valve body serving as a movable component will be correspondingly bulky and heavy. Wearing on the surfaces along which the movable valve body and the sealing member are in slidable contact with each other is rather significantly influenced by the load of the movable valve body in practice, but this influence has been heretofore substantially neglected.

The first object of the present invention is to improve the sealing and intercepting effect between the movable valve body and the stationary outer casing so that this effect may be obtained regardless of the pressure within the flow path. The second object of the present invention is to provide an arrangement such that the sealing member interposed between the movable valve body and the stationary outer casing provides a reliable sealing and intercepting effect not only along its surface which bears against the outer casing but also its surface which rubs against the movable valve body regardless of the frequency at which the valve is operated, particularly providing the urging effect immediately in response to deformation and distortion thereof. The third object of the present invention is to prevent undesirable wearing occurring on the intercepting surface due to a load of the movable valve body with which a lower portion of the sealing member is concentratedly burdened so that the rubbing surface may be evenly urged in terms of condition so as to provide a permanently reliable sealing and intercepting effect. The other objects of the present invention will be apparent from the following description of features and preferred embodiment of the present invention.

SUMMARY OF THE INVENTION

The above-mentioned objects of the present invention are achieved, according to the present invention, by an arrangement wherein an annular sealing member is provided with an annular expanding resilient member acting upon the concavo-spherical rear surface of the sealing member. The rear surface of the sealing member has a saucer form, and it is urged by the annular expanding resilient member against the movable valve body. The annular sealing member includes a cylindric outer periphery which is urged by the annular expanding resilient member against the inner wall of the stationary outer casing. The annular expanding resilient member has a V- or U-shaped cross-section, and the edges corresponding to the two legs of the V- or U-shaped are provided with a plurality of radial notches. The bottom edge of the resilient member corresponding to the bottom of the V- or U-shape has an arcuate or curved cross section. A plurality of rising pieces defined by the notches individually act on the convexo-spherical inner edge and cylindric outer periphery, and thereby close contacts with their respective opposite components are separately established in response to partial deformation of the inner and outer edges. Accordingly, an array of disjuncted biasing loads are imposed by the annular expanding resilient member uniformly about the sealing peripheries to assure a continuous sealing relationship regardless of localized wear or irregular configurations.

In accordance with the present invention, there is also provided a special measure to support the movable valve body by which the loading due to the weight of the movable valve body itself is eliminated. Consequently, the entire circumferential zone defined by the inner and outer edges of the sealing member may be evenly urged against the opposite components under the effect of the annular expanding resilient member. This facilitates a partial pressure propagation, according to the partial condition of surface contact, over the rubbing surfaces between the inner edge of the sealing member and the movable valve body as well as over the bearing surfaces between the outer periphery of the sealing member and the stationary outer casing under the effect of the plurality of rising pieces, respectively. Thus, concentration of the load of the movable valve body at the lower portion of the sealing member is avoided by supporting the load on a separate supporting member to prevent a partial wearing of the sealing member.

The supporting member for the movable valve body is characterized in that it does not detract from the quality of the sealing and intercepting effect or complicate the sealing and intercepting mechanism since the supporting member is located in a space free from the influence upon the effect of sealing and intercepting the flow path and incorporation of the supporting member results in negligible frictional resistance in the operation of the valve.

In the illustrated embodiment, the supporting member is arranged in opposition to the bottom surface of the movable valve body which presents a convexospheric outer surface, and the supporting member comprises a cone spring having a conical surface located within the stationary outer casing adjacent the inner bottom surface thereof. The axis of the cone spring is conincident with the rotary axis of the movable valve body so that the cone spring is substantially in point contact with the stationary outer casing and in circumferential line contact along its concavo-conical surface with the movable valve body in order to provide a minimum amount of friction upon rotation of the movable valve body. Accordingly, the movable valve body is support with a minimum resistance to operation of the valve since the supporting axis of the cone spring coincides with the rotary axis of the movable valve body, and it is floatingly held in a well balanced condition relative to the weight of the movable valve body itself under the upward biasing effect of the cone spring.

In the illustrated embodiment, both the rubbing surfaces between the inner edge of the sealing member and the convexo-spherical surface of the movable valve body and the bearing surfaces between the outer periphery of the sealing member and the stationary outer casing are maintained under an even and uniform contact condition over the entire areas of engagement. Under such a condition of even contact, the axis of the flow path, the axis of the sealing member and the axis transverse of the rotary axis of the movable valve body conincide with one another. Further, the plurality of rising pieces of the annular expanding resilient member, as previously mentioned, individually act upon the rubbing surfaces and bearing surfaces so that the effective maintenance of reliable sealing and intercepting effect as well as prevention of a leakage due to wearing may be simultaneously achieved.

BRIEF DESCRIPTION OF THE DRAWINGS

FIG. 5 is a fragmentary sectional view on an enlarged scale showing the relative position of a movable valve body and an outer casing half having the sealing member interposed therebetween in an assembled condition as shown in FIG. 1;

FIG. 6 is a plan view showing a cone spring on an enlarged scale; and

FIG. 7 is a sectional view taken along a line 6 — 6 in FIG. 6.

Referring to FIG. 1, a ball valve 10 having an outer casing 11 is shown. The outer casing 11 comprises two outer casing halves 12 and 13. The outer casing halves are engaged with each other to form the integral casing body 11 after an expanding resilient member 14, a sealing member 16 serving as a valve seat, a cone spring 17 and a movable valve body 15, as will be described later, have been accommodated in the former half 12, and another expanding resilient member 14 and another sealing member 16 similarly serving as another valve seat have been accommodated in the latter half 13. A packing 18 is interposed between the outer casing halves 12 and 13 during the step of integrally assembling the two outer casing halves. The two outer casing halves 12 and 13 may be clamped together by a bolt 20 with interposition of the packing 18. The outer casing halves 12 and 13 are provided with flanges 22 and 23, respectively, which are adapted to be engaged with flanges of pipe members (not shown) with interposition of a suitable packing so that the ball valve 10 may be mounted in a pipe line system by inserting bolts into holes provided in the flanges 22, 23 and securely threading nuts on the respective bolts.

Figure 1:
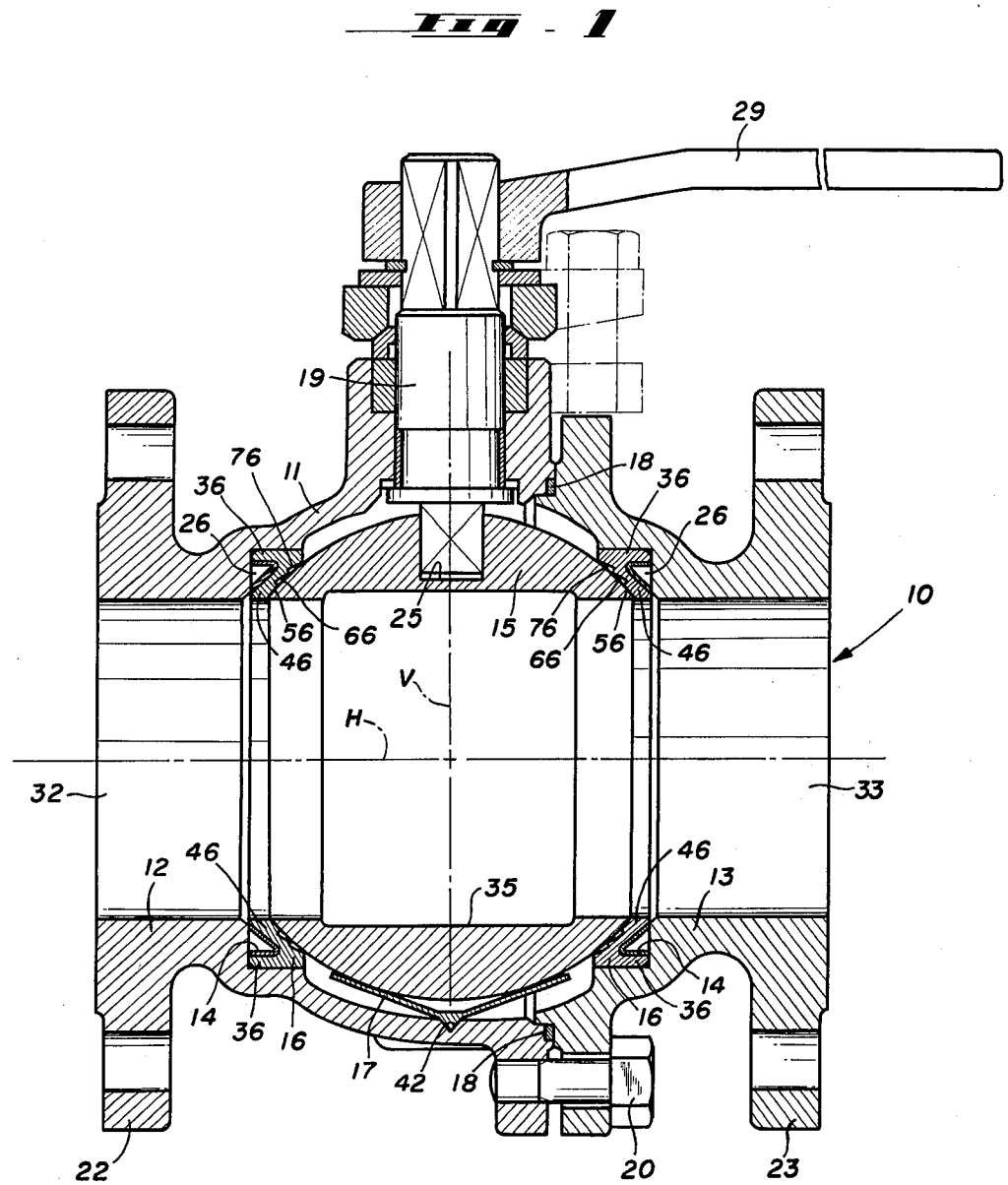
FIG. 1 is an axial section showing an embodiment of a ball valve according to the present invention.

A shaft 19 serving to operate the valve 10 is provided. The shaft 19 includes at its lower end a square shaft portion adapted to be inserted into a square hole 25 provided in the upper surface of the movable valve body 15 for purposes of rotating the valve body 15 around the axis of the shaft 19 by operating a handle 29.

The movable valve body 15 provides a substantially convexo-spherical outer surface and an opening or passage 35 which defines a flow path extending centrally through the movable valve body 15. The ball valve 10 is especially adapted for controllably opening and closing the flow path. The flow path is opened when the opening 35 is aligned with openings or passages 32 and 33 extending through the outer casing halves 12 and 13, respectively. The path defined by the aligned openings 32, 35 and 33 is intercepted when the handle 29 is turned so as to rotate the operating shaft 19 by an angle of 90° to thereby position the opening 35 of the movable valve body 15 transversely to the openings 32 and 33 of said outer casing halves 12 and 13.

The ball valve 10 as described hereinabove is substantially the same as conventional ball valves in the arrangement of the respective parts and the effect provided by such arrangement. The ball valve 10 according to the present invention is, however, characterized by the requirement with which the sealing members 16, and the expanding resilient members 14 and the cone spring 17 both adapted to be mounted in combination with the respective sealing members 16 are arranged and located.

Figure 2:
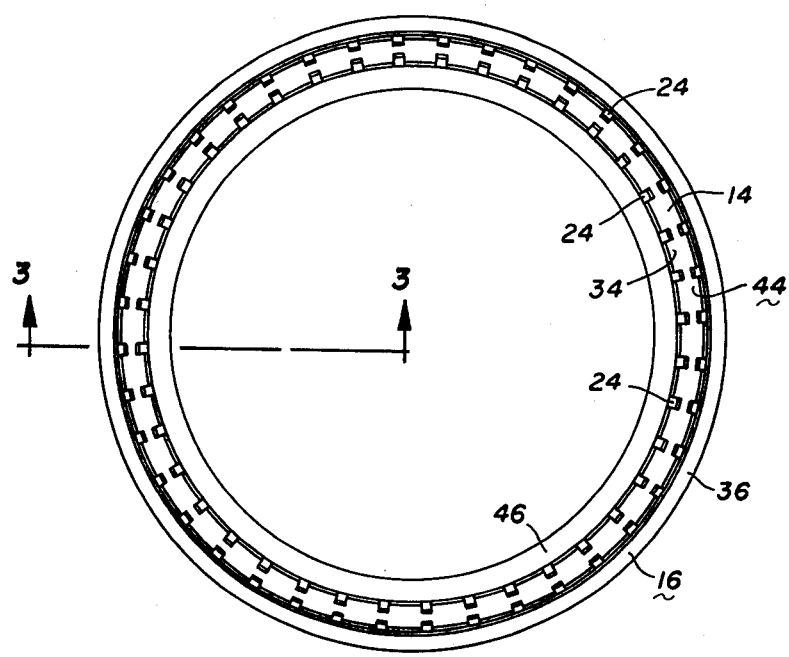
FIG. 2 is a front view on an enlarged scale showing a sealing member employed in the ball valve, and an expanding resilient member incorporated in the sealing member.

The sealing members 16 are made of a material such as Teflon or other high-molecular weight plastic and formed as rings extending along the outer peripheries of the openings 32 and 33 as shown in FIG. 2. Each of the ring-shaped sealing members 16 has an annular groove 26 circumferentially extending on the outer periphery thereof with a cross-section substantially of a deep V- or U-shape, as shown in detail by FIGS. 3 and 5.

An outer frame edge 36 of each sealing member 16 extends outwardly with respect to the groove 26 and presents a cylindric outer periphery which is adapted to be engaged into an annular recess of the respective outer casing halves 12 and 13 to define a bearing surface against a wall extending therearound. An inner frame edge 46 of each sealing member 16 extends inwardly with respect to the groove 26 and presents an inner periphery which is defined by a concavo-spherical surface with a radius corresponding to the radius of the convexo-spherical outer surface of the movable valve body 15. Accordingly, the sealing member 16 may have its inner periphery in the form of a saucer.

The concavo-spherical surface of each sealing member 16 includes a portion 56 which presents a concavo-spherical contact surface with the outer surface of the movable valve body 15, along which the both components are slidably moved relative to each other. Annular ridges defined along boundaries among two annular recesses 66 and 76, which extend continuously from the contact surface 56, and an inner end surface lie substantially on an extension of the concavo-spherical surface corresponding to the contact surface 56 so that the ridges come into contact with the convexo-spherical surface of the movable valve body 15 in the assembled ball valve. The annular recesses 66 and 76 also serve to reduce friction occurring in the operation of the movable valve body 15.

Figure 3:
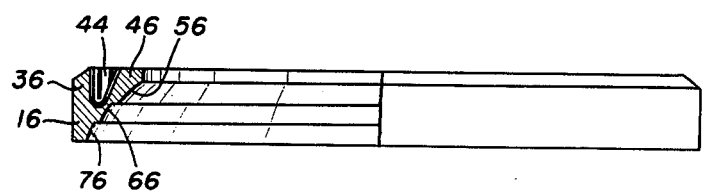
FIG. 3 is a side view partially in section showing the sealing member and expanding resilient member along the line 3 — 3 in FIG. 2.
Figure 4:
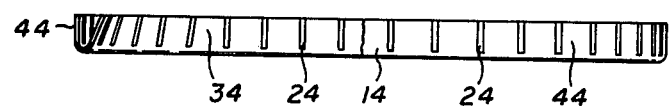
FIG. 4 is a side view partially in section and on an enlarged scale showing the expanding resilient member.

The expanding resilient member 14 has an annular shape corresponding to the annular groove 26, and it is resiliently loaded in the annular groove 26 of the sealing member 16. The expanding resilient member 14 comprises an annular member having a radial cross-section in V or U-shape as shown in FIGS. 3, 4, and 5. The member 14 is made of a highly resilient material such as steel, and a radius of the angular portion of its cross-section is substantially equal to the radius of the annular groove 26.

The angle defined by the two peripheral edges of the sealing member 16, which corresponds to the angle defined by both legs of its V- or U-shape, is preselected so as to be wider than the angle defined by opposite walls of the annular groove 26, so that the expanding resilient member 14 resiliently loaded in the corresponding annular groove 26 may bias both of the opposite walls 36, 46 of the sealing member 16 so as to widen the groove 26. This biasing effect is useful to improve the function of intercepting and sealing achieved by the sealing member 16 together with the associated outer casing half 12 or 13 along the bearing surface therebetween as well as to improve the same function achieved by the sealing member 16 together with the associated movable valve body 15 along the contact surface 56 therebetween after incorporation of said sealing member 16.

The annular expanding resilient member 14, as shown most clearly in FIGS. 2 and 4, is provided with a plurality of radially dispersed notches 24 which define a plurality of rising pieces 34 and 44. The notches 24 are provided across the outer peripheral edge and the inner peripheral edge of the expanding resilient member 14 except for the curved end surface corresponding to the bottom of both said edges. The rising pieces 34 are provided along the inner peripheral edge and, similarly, the rising pieces 44 are provided along the outer peripheral edge.

The movable valve body 15 is enclosed within the outer casing halves 12 and 13 prior to the incorporation of the ball valve 10 into a pipe line system. The valve body 15 is supported with interposition of the sealing members 16 which are, in turn, mounted under biasing effect of the associated expanding resilient members 14 between the outer casing halves 12 and 13.

The angular distance of the inner and outer peripheral edges of each expanding resilient member 14 is preselected so as to be wider than the angular distance of the inner and outer frame edges 46 and 36 of each sealing member 16 which are opposed to each other across the annular groove 26. Thus, the expanding resilient member 14 is urged into the groove 26 of the associated sealing member 16 under a clamping force occurring as the bolt 20 is threaded in to clamp the outer casing halves 12 and 13 together upon assembly, and the inner and outer frame edges 46 and 36 are biased in opposite directions so as to widen the groove 26 defined by the edges. The pressure at which the movable valve body 15 is supported by the outer casing halves with interposition of the sealing members 16 depends upon the degree of clamping of the bolt 20.

The supporting pressure for the valve body 15 also serves as a resistance against rotation of the valve body. When the supporting pressure exceeds a certain limit, the increasing friction on the surface along which the contact surface 56 of the sealing member 16 is slidably moved relative to the outer surface of the movable valve body 15 results not only in a larger external force required for operation but also in an increase of wear due to the operation of the valve. Accordingly, the clamping of the bolt 20 is preferably performed in consideration of this aspect.

The manner in which the movable valve body 15 is supported under such a clamping effect, however, may cause undue wear on the inner lower edge of the sealing member 16 when the movable valve body 15 is frequently rotated by operating the valve, since the loading of the movable valve body 15 upon the sealing member 16 is practically concentrated into the lower portion thereof. The cone spring 17 serves to support this loading of the movable valve body 15, and it comprises a saucer-like body having a concavo-conical surface with slots 37 radially extending from the peripheral edge toward the center threreof as shown in detail by FIGS. 6 and 7. The number of slots 37 is preferably on the order of 4 to 12, and they are arranged with an equal angular space as shown. The greater the number of slots, the lower the resiliency of the cone spring 17 which is directed upward. Accordingly, the number of slots should be properly selected depending on the material and the plate thickness of the cone spring itself. It is generally preferred for a cone spring made of steel plate to provide 4 to 6 slots 37 in the form of notches. Depending upon the manner of providing the slots, the slots may be linear slots which are angularly disposed with respect to the radial direction or they may be slightly curved slots forming a swirl as a whole. Openings 47 which are cut at the inner ends of the respective slots 37 are provided to prevent the respective slots from further splitting as the cone spring 17 is used.

The cone spring 17 is provided at its central portion corresponding to the cone apex with a conical projection 27. In an assembled condition, the projection 27 is directed downward so as to be received in a seat recess 42 provided in the inner bottom surface of the outer casing half 12, above which the movable valve body 15 is accommodated. The seat recess 42 is provided on the lower extension of the axis of the valve operating shaft 19, and the movable valve body 15, accommodated on this seat recess 42 with interposition of the cone spring 17, has its own weight supported by the upward resiliency of the cone spring 17. The movable valve body 15 is thus supported by the upward resiliency of the cone spring 17 so that the movable valve body 15 does not burden the lower edge of the sealing member 16 with a substantial load. Consequently, the contact surface 56 of the sealing member 16 is free, over the entire area thereof, from the influence of the weight of the movable valve body 15 and disposed in even frictional contact with the outer surface of the movable valve body 15.

As shown in FIG. 1, a horizontal axis H extending transversely of the axis V of the valve operating shaft 19 is aligned with the axis of the flow path defined by the openings 32 and 33 as well as with the common axis of the both sealing members 16. In the support arrangement utilizing the cone spring 17, the cone spring 17, burdened with the load of the valve body 15, is supported by the conical projection 27 which is received in the seat recess 42 substantially in point contact with the inner bottom surface of the outer casing half 12. The convexo-spherical surface defining the bottom of the movable valve body 15 comes in contact with the inner concavo-conical surface of the cone spring 17 along a circumferential line as indicated by a single-dot-chain line C in FIG. 6. Friction occurs also along this line C as the movable valve body 15 is rotated and, accordingly, a frictional resistance to rotation of the valve operating shaft 19 by turning the handle 29 is extremely low.

As shown in the illustrated embodiment, the cone spring 17, serving as a mechanism to support the load of the movable valve body 15, is located within a space in the outer casing half 12 separated from the space in the outer casing half 12 defined between both sealing members 16 so that the contact surfaces 56 of the sealing members 16 are entirely free from the influence of the cone spring 17 and no flow path resistance is provided by the cone spring 17.

Referring to FIG. 5, each rising piece 34 of the expanding resilient member 14 separately biases the frame edge 46 at the corresponding portion toward the spherical center of the movable valve body 15 as indicated by the arrow 34a in FIG. 5 to bring the contact surface 56 into a close contact with the outer surface of the valve body 15 which is supported in a floating condition. Similarly, each rising piece 44 separately biases the frame edge 36 at the corresponding portion against the inner walls of the outer casing halves 12 and 13 as indicated by the arrow 44a to achieve a close contact between the sealing members 16 and the outer casing halves. Thus, a high sealing function is achieved entirely irrespective of the pressure within the flow path.

An important function provided according to the present invention is, as mentioned just above, to bring the contact surface 56 of each sealing member 16 which is in an even contact condition free from the influence by the load of the movable valve body 15 into a close contact with the outer surface of the movable valve body 15 toward the spherical center thereof under the biasing effect of the respective rising pieces 34. Accordingly, deformation and distortion of the sealing members 16 are immediately compensated at every portion to maintain the contact surfaces 56 closely against the outer surface of the movable valve body 15 when the latter is in a stationary position or being rotated. This is particularly advantageous when the surface of the movable valve body 15 or the contact surfaces 56 of the sealing members present abnormal deformation due to partial wearing since the respective rising pieces 34 provide separate and independent urging effects depending upon the condition of deformation to prevent even a slight leakage.

According to the present invention, therefore, the movable valve body 15 may be held by the cone spring 17 under a suitable upward biasing effect thereof and the sealing effect may be improved under the condition of uniform contact. The present invention thus provides a ball valve which is highly durable and reliable.

Although the present invention has been described hereinabove with reference to the illustrated embodiment as a preferred form for practical use, it should be noted that this embodiment is merely one of many possible forms of modification and improvement employable depending upon the particular application and requirement of use within the scope of the invention.

What is claimed is:

1. A ball valve comprising a plurality of outer casing elements adapted to form together an outer casing in which a movable valve body is accommodated, accommodation of said movable valve body in said outer casing being achieved by coupling said plurality of outer casing elements, a valve operating shaft journaled by said outer casing elements so as to rotate said movable valve body, an annular sealing member interposed between said movable valve body and outer casing elements to effect sealing and interception therebetween, and a resilient supporting member comprising a cone spring located on the inner bottom surface of said outer casing and having a concavo-conical surface embracingly engaging a convexo-spheric outer surface of said movable valve body so that said cone spring is burdened with the load of said movable valve body placed thereon and the surface along which said sealing member is in close contact with said movable valve body is free from influence by said load of the movable valve body, said cone spring also having an axis coincident with the rotary axis of said movable valve body, an apex received in a seat in said outer casing elements for providing substantially point contact therewith, and a plurality of slots extending from its outer periphery to associated apertures in said cone spring adjacent the center thereof.

* * * * *